Dec. 22, 1936.  J. M. DAPRON  2,065,212
BRAKE APPARATUS FOR CARS
Filed April 7, 1934
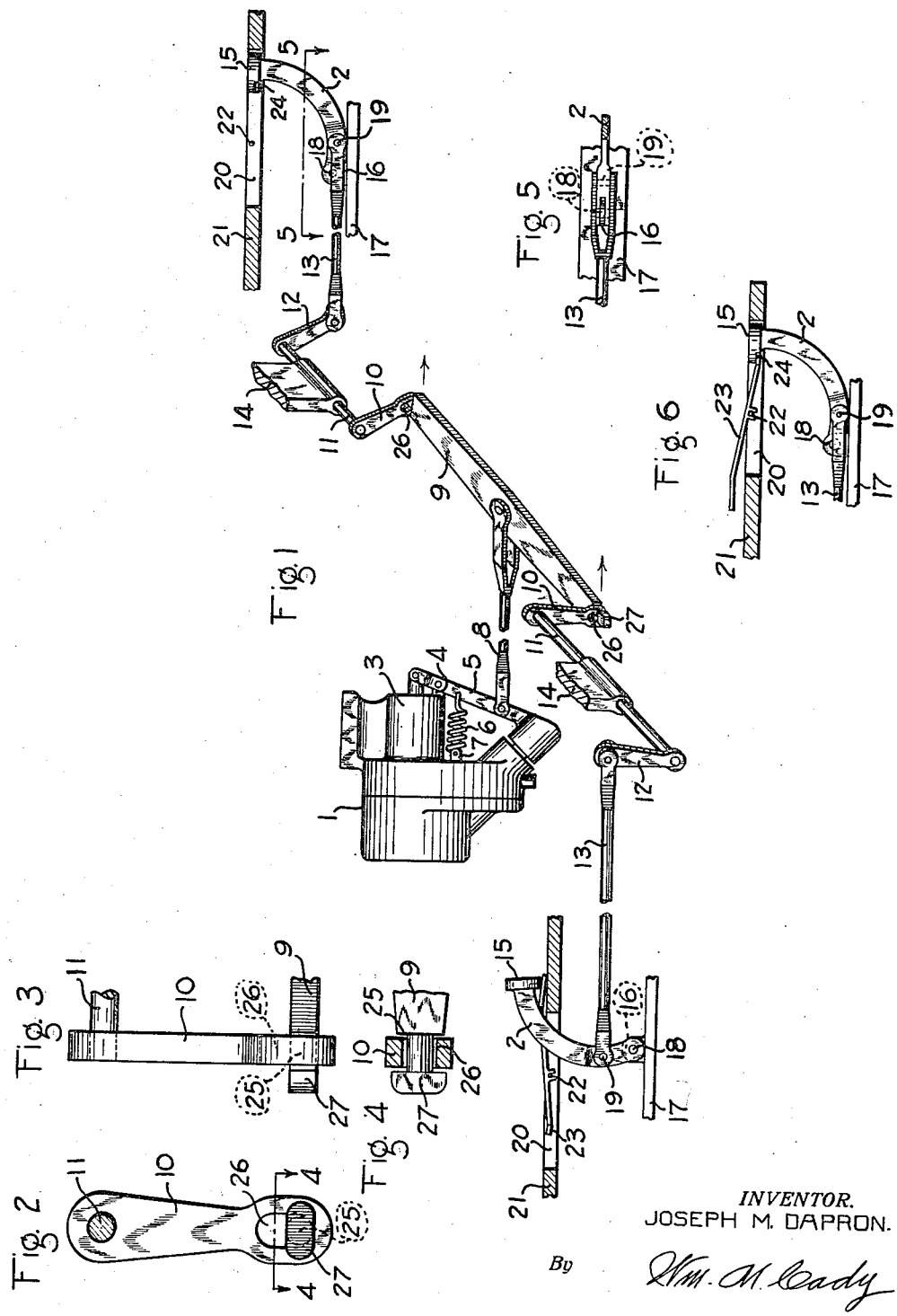
INVENTOR.
JOSEPH M. DAPRON.
By Wm. M. Cady
ATTORNEY.

Patented Dec. 22, 1936

2,065,212

UNITED STATES PATENT OFFICE 2,065,212

BRAKE APPARATUS FOR CARS

Joseph M. Dapron, St. Louis, Mo., assignor to The Westinghouse Air Brake Company, Wilmerding, Pa., a corporation of Pennsylvania Application April 7, 1934, Serial No. 719,503

12 Claims. (Cl. 188—107)

This invention relates to fluid pressure brakes and more particularly to a manually controlled mechanism for controlling the operation thereof.

In order to facilitate more rapid application and release of the brakes on a car than is obtainable when the brake valve device is located at the end of the car remote from the main reservoir supply and the brake cylinder, it has heretofore been proposed to locate the brake valve device intermediate the ends of the car and thereby close to the main reservoir and brake cylinder, and then, by means of mechanical links, cables or otherwise, connect the brake valve device to a manually operated control member at one or both ends of the car, according to whether the car is adapted to single end or double end operation.

One object of my invention is to provide improved means for connecting a brake valve device located intermediate the ends of a car to manual control members at both ends of the car, so that the brake valve device may be controlled from either one end or the other, as desired.

Another object of my invention is to provide improved means for connecting a brake valve device to operating means at the opposite ends of a car, when the brake equipment is of the type in which the brake valve device is located intermediate the ends of the car and in substantially the transverse center of the car, while the operating means at one end of the car is located at one side of the car and the operating means at the other end of the car is located at the opposite side of the car.

Another object of my invention is to provide an improved brake controlling apparatus comprising a brake valve device located intermediate the ends of a car, and a lever mechanism operatively connecting the brake valve device to a foot pedal at each end of the car, each foot pedal having a self-locking position in which control of the brake valve device by the other foot pedal is permitted.

Another object of my invention is to provide an improved foot pedal arrangement for controlling a brake valve device, the pedal normally extending through and above the floor of a car for permitting operation thereof to control the application and release of brakes, and movable to a self-locking position to effect a full application of the brakes or to condition means for permitting control of the brakes from the opposite end of the car, all parts of the pedal in the self-locking position being flush with or somewhat below the floor of a car to prevent accidental or malicious movement out of the self-locking position, a removable foot operated key being provided to move the pedal out of the self-locking position and adapted to be associated at all times with the pedal being employed to control the brakes, so that in case this control pedal is moved into the locking position while controlling the brakes, it may be readily moved out of said position without delay or in any way interfering with the proper control of the brakes.

Other objects and advantages will be apparent from the following, more detailed description of the invention.

In the accompanying drawing; Fig. 1 is a substantially isometric projection of a portion of a brake controlling apparatus embodying my invention; Fig. 2 is an enlarged face view and Fig. 3 an enlarged side view of one of the levers shown in Fig. 1; Fig. 4 is a sectional view of the lever shown in Figs. 2 and 3 and taken on line 4—4 in Fig. 2; Fig. 5 is a sectional view taken on the line 5—5 of Fig. 1; and Fig. 6 is a view of the self-lapping pedal arrangement with the unlocking key in position for unlocking the pedal.

The brake apparatus shown in the drawing, for the purpose of illustrating an application of the invention, is of the double end type and comprises a brake valve device 1 located intermediate the ends of the car and substantially on the transverse center line of the car, and a foot operated pedal 2 at each end of the car for controlling the operation of the brake valve device 1 in a manner and through the medium of a mechanical arrangement which will be hereinafter described.

The brake valve device 1, which is employed to illustrate an application of the invention, may be similar to that disclosed in Patent No. 1,816,089 issued to J. C. McCune on July 18, 1931, and comprises a casing 3 having a bracket 4 upon which is pivotally mounted a lever 5 adapted upon counterclockwise rotation to cause the brake valve device to be operated to effect an application of the brakes. A tension spring 6, having one end secured to a bracket 7 on the brake valve casing and the other end secured to lever 5, tends to rotate said lever in a clockwise direction so as to effect the operation of said brake valve device to release the brakes. A further description of the brake valve device is deemed unnecessary in this application, since it is fully described in the aforementioned patent and forms no part of the present invention.

According to the invention, a pull rod 8 is pivotally connected at one end to the brake valve lever 5 and at the other end to a cross lever 9 at its central portion, the lever 9 extending transversely of the car.

One end of the cross lever 9 is operatively connected to the foot pedal 2 at one end of the car, while the other end is connected in the same manner to pedal 2 at the other end of the car, the connection to each of said foot pedals consisting of a lever 10 secured to one end of a shaft 11 and pivotally connected to one end of the cross lever 9, a lever 12 secured to the other end of said shaft, and a pull rod 13 having one end pivotally connected to the free end of lever 12 and the other end pivotally connected to the foot pedal 2.

The pivotal connection between the levers 10 and the ends of the cross lever 9 is effected through the medium of an extension 25 on the ends of the cross lever extending through an elongated opening 26 in the respective levers 10. The diameter of the extension is sufficiently less than the width of the elongated opening to permit lever 9 to rock relatively to lever 10, when one lever 10 is locked against rotative movement and the other lever 10 is rotated to operate the lever 9 as will be hereinafter described.

In order to permit the assembly and locking of the lever 9 with the levers 10, there is provided at the end of each extension 25 an elongated head 27, which is adapted to be inserted through the elongated opening 26 and then by a rotation of the lever 9 through an angle of 90 degrees, to the working position, as shown in the drawing, the heads 27 serve as locking means to hold the levers 10 assembled with lever 9.

The shafts 11 are journaled in suitable bores in brackets 14 which are secured to a fixed portion of the car.

Each of the pedals 2 is provided on the free end with a foot plate 15 for engagement by the foot of an operator, while the other end of the foot pedals is bifurcated to straddle a lug 16 carried by a bracket or other fixed member 17 at each end of the car, a pin 18 being provided to pivotally connect each of said pedals to its respective lug 16.

The end of the rods 13, which is connected to the foot pedal 2, is bifurcated so as to straddle the bifurcated end portion of each foot pedal, and the pivotal connection between said rods and pedals is effected through the medium of pins 19. The depth of the bifurcation in rods 13 is such as to freely receive the pivoted end of the pedal when the pedal is depressed into engagement with the respective member 17, in which position the pedal 2 at the right hand side of Fig. 1 is shown.

The pedal fulcrum pin 18 is so spaced from the upper surface of member 17 that when the pedal is depressed into engagement with said member, force applied through rod 13 to pin 19 acts on a line located below the center of pin 18 so as to hold the pedal in engagement with said member, thereby providing an over dead center or self-locking position.

Each foot pedal 2 extends through a suitable slot 20 in the car floor 21 and is so located with respect to the car floor that when in the locked position, the foot plate 15 does not project above the surface of the floor, but instead is substantially flush with said floor, as shown at the right of Fig. 1 and in Fig. 6. The pedal at the non-operating end of the car is conditioned as just described in order to prevent accidental or malicious movement thereof while the car is being controlled from the opposite end of the car.

A fulcrum pin 22 is provided in the car floor and extends into the slot 20, and a pedal unlocking key 23 is adapted to be pivotally mounted in said pin, said key having on one side a slot adapted to fit over the pin 22, the slot being open at one end to permit removal of the key from pin 22.

The under face of the pedal foot plates 15 is provided with a recess 24 adapted to receive one end of the unlocking key 23 when said key is mounted on the pin 22, and the key is so shaped that when the pedal is in the locked position and said key is engaging in said recess, the other end of the key extends above the floor of the car, as shown in Fig. 6.

There is only one key 23 provided on a car and it is carried by pin 22 at the operating or controlling end of the car. At the non-operating end of the car, the pedal 2 is carried in the locked position.

In Fig. 1, the apparatus is shown with the pedal 2 at the right hand end in locked position, and the pedal 2 at the left hand end in operating condition. With the pedal 2 at the right hand end in locked position, the pin 19 being below the pin 18, pull exerted on the rod 13 is prevented from moving the pin 19 in the direction of pull by the engagement of the bifurcated end of the rod 13 with the member 17, so that the pin 19 acts to hold the rod 13 and thereby the lever 10 in a fixed condition.

At the left hand or operating end of the equipment, the pedal 2 is shown in the brake release position, to which position it is moved by a spring, such as spring 6, upon the relief of foot pressure on foot plate 15. It will be noted that at the operating end of the apparatus, the key 23 is in place on the pin 22 and one end of the key is engaged by the foot plate 15, when the pedal is in brake release position, so as to tend to keep the key from rattling when the car is in motion with the brakes released.

If it is desired to apply the brakes by operation of the foot pedal 2 at the left hand or operating end of the car, the operator places the ball of his foot against the foot plate 15 at said end of the car and turns the pedal 2 in a counterclockwise direction. This movement of the pedal 2 acts through the connected rod 13, lever 12, shaft 11 and lever 10 on the cooperating end of the cross lever 9, and turns said cross lever in a counterclockwise direction with the other lever 10 acting as a fulcrum for lever 9, the lever 10 at the non-operating end of the car being held against rotation because the rod 13 is locked against longitudinal movement as previously explained. This rotation of lever 9 acts through the pull rod 8 to turn the brake valve lever 5 in a counterclockwise direction to cause the brake valve device to operate to effect an application of the brakes.

The brake valve device 1 is of the well known automatic lapping type which operates to regulate the degree of application and release of brakes according to the degree of rotation of lever 5 from the normal position in which it is shown in Fig. 1, and this degree of rotation can be governed by the movement of the pedal 2 at the operating end of the car.

The movement of the brake valve lever 5 required to effect a full application of the brakes is obtained when the foot pedal 2 is depressed to the position in which the line of force acting through pull rod 13 passes through the center of the pedal fulcrum pin 18. This is the dead center position of the pull rod 13 and pedal 2 and in order to obtain a full application of the brakes, it is possible that the pedal 2 at the operating end of the car will be moved directly to the over-travel or locking position shown in Fig. 6.

Just before the foot pedal 2 at the operating end of the car is rotated into dead center position, the foot plate 15 engages the outer end of the unlocking key 23 and rotates said key so as to raise the other end of the key away from the car floor 21 and into engagement with the heel of the operator's foot which is rotating said pedal. Accordingly, if the operator desires to move the foot pedal into the dead center or locking position, it is necessary to rock his foot so that his foot will not engage the adjacent end of the key 23 to thereby permit the inner end of the key to rise away from the car floor as required.

If it is desired to effect a release of the brakes, the foot pedal is relieved of foot pressure which permits spring 6 at the brake valve device to turn the brake valve lever 5, cross lever 9, and consequently the pedal 2 in a clockwise direction, the degree of release depending upon the extent to which the foot pedal is relieved of foot pressure, and the position the pedal is allowed to assume between the full application and full release positions.

In case the foot pedal 2 has been moved to dead center or locking position in effecting an application of the brakes, it will be evident that the brake valve spring 6 can not operate to effect a release of the brakes, however, in this circumstance the operator can effect the release of brakes by pressing the inner end of the unlocking key 23 into engagement with the car floor by means of his heel. This act throws the pull rod 13 above the dead center position after which the brake valve release spring will operate as above described.

If it is desired to operate the car from the opposite or right hand end, the pedal 2 at the left hand end is depressed to the locking position in which it engages the member 17. The unlocking key 23 is then removed from the pin 22 at the left hand end of the car and applied to the corresponding pin at the right hand end of the car as shown in Fig. 6. The operator then applies heel pressure to the inner end of said key which acts to pull the pedal 2 at the right hand end of the car over dead center position, whereupon the brake valve spring 6 acts to release the brakes and move said pedal to the release position.

It will be noted that placing the pedal 2 at the left hand end of the equipment in the locking position fixes the position of the corresponding end of the cross lever 9 so that it becomes a fixed fulcrum for said cross lever when the brakes are to be controlled by the pedal 2 at the right hand end of the equipment, in other words, one end or the other of the cross lever 9 acts as a fixed fulcrum according to which pedal is adjusted to the self-locking position, so that said lever may be operated by the pedal 2 at the opposite end of the car for controlling the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a double end car brake equipment, the combination with a foot pedal at each end of the car either of which is operative to control the operation of a single brake valve device, mechanical members operatively connecting said foot pedals to said brake valve device, either one of said pedals being movable by foot pressure to tension said mechanical members to effect the operation of said brake valve device to apply the brakes, and each pedal having an over center locking position with respect to the direction of force acting through said mechanical members, either foot pedal when in said locking position being adapted to condition the mechanical connection for operation by the other foot pedal.

2. In a double end car brake equipment, the combination with mechanical means operatively connected to a brake valve device and extending to the two ends of the car, said mechanical means including a foot pedal at each end of the car either of which is operative to control the operation of said brake valve device, each of said foot pedals having a fixed fulcrum and being movable to a position in which the force for actuating said brake valve device acts at one side of said fulcrum, and means for defining said position, either pedal when in said position, conditioning said mechanical means and the other pedal for controlling the operation of said means.

3. In a double end car brake equipment, the combination with a lever adapted to be fulcrumed at either one end or the other and operative upon movement about the fulcrumed end to control the application and release of brakes on the car, a foot pedal at each end of the car having a fixed fulcrum, mechanical means operatively connecting one of said foot pedals to one end of said lever and the other of said foot pedals to the other end of said lever, said foot pedals being operative when moved by manual pressure to apply force through said mechanical means to said lever for rocking said lever, stop means for defining the maximum depressed position of said pedals, the connection of said mechanical means to said pedals being so arranged with respect to the fixed fulcrum of said pedals, that when said pedals engage said stop means, force transmitted through said mechanical means acts to hold said pedals against said stop means, one of said pedals when engaging said stop means conditioning said levers for operation by the other foot pedal.

4. In a car brake equipment, the combination with a foot pedal having a fixed fulcrum, and mechanical means pivotally connected to said foot pedal at one side of said fixed fulcrum and operative, when said foot pedal is moved by manual pressure, to effect an application of brakes, said pedal being movable by manual pressure to a position in which force transmitted through said mechanical means acts in a line on the opposite side of said fixed fulcrum, fixed means for defining said position, a member for moving said pedal out of said position, and resilient means acting to hold said pedal in said position and operative upon movement of said pedal out of said position to oppose foot pressure on said pedal.

5. In a car brake equipment, the combination with a foot pedal having a fixed fulcrum, and mechanical means pivotally connected to said foot pedal at one side of said fixed fulcrum, said foot pedal being movable by manual pressure to operate said mechanical means to effect an application of the brakes, and being further movable in the same direction to a position in which the force transmitted through said mechanical means acts in a line on the opposite side of said fulcrum, fixed means for defining said position, resilient means normally opposing movement of said pedal by foot pressure and acting in said position to urge said pedal into engagement with said fixed member, and means operative to move said foot pedal out of said position until said force acts in a line on the first mentioned side of said fulcrum.

6. In a car brake equipment, the combination with a foot pedal having a fixed fulcrum, and mechanical means pivotally connected to said foot pedal at one side of said fixed fulcrum, said foot pedal being movable by the ball of an operator's foot to operate said mechanical means to effect an application of brakes and being further movable in the same direction to a position in which the force transmitted through said mechanical means acts in a line on the opposite side of said fulcrum, fixed means for defining said position, resilient means normally opposing movement of said pedal by foot pressure and operative in said position to hold said pedal in engagement with said fixed means, and a member movable into engagement with the heel of said operator's foot upon said further movement of said foot pedal and operative by pressure from the operator's heel to move said pedal out of said position to a position in which said resilient means opposes manual pressure on said pedal.

7. In a car brake equipment, the combination with a fixed bracket beneath the floor of a car, of a foot pedal fulcrumed on said bracket and extending through an opening in the car floor, and mechanical means pivotally connected to said pedal at one side of said pedal fulcrum, said pedal being movable by manual pressure to operate said mechanical means to effect an application of the brakes and being further movable to a position in which the force transmitted through said mechanical means acts in a line on the other side of said fulcrum, and in which position the free end of said pedal is flush with the car floor, fixed means for defining said position, resilient means normally opposing movement of said mechanical means and pedal by manual pressure and acting in said position to urge said pedal against said fixed bracket, and means operative by manual pressure to move said pedal out of said position until the force transmitted through said mechanical means acts in a line on the first mentioned side of said fulcrum.

8. In a car brake equipment, the combination with a fixed bracket beneath the floor of the car, of a foot pedal fulcrumed on said bracket and extending through an opening in the car floor, and mechanical means pivotally connected to said pedal at one side of said pedal fulcrum, said pedal being movable by manual pressure to operate said mechanical means to effect an application of the brakes and being further movable to a position in which the force transmitted through said mechanical means acts in a line on the other side of said fulcrum, and in which position the free end of said pedal is flush with the car floor, fixed means for defining said position, resilient means normally opposing movement of said mechanical means and pedal by manual pressure and acting in said position to urge said pedal against said fixed bracket, and means carried by the car floor and operative by manual pressure to move said pedal out of said position until the force transmitted through said mechanical means acts on the first mentioned side of said fulcrum, said means being removable when said pedal is in said position.

9. In a car brake equipment, the combination with a fixed bracket beneath the floor of a car, of a foot pedal fulcrumed on said bracket and extending through an opening in the car floor, and mechanical means pivotally connected to said pedal at one side of said pedal fulcrum, said pedal being movable by manual pressure to operate said mechanical means to effect an application of the brakes and being further movable to a position in which the force transmitted through said mechanical means acts in a line on the other side of said fulcrum, and in which position the free end of said pedal is flush with the car floor, fixed means for defining said position, resilient means normally opposing movement of said mechanical means and pedal by manual pressure and acting in said position to urge said pedal against said fixed bracket, and means carried by the car floor and movable into engagement with the heel of the operator's foot employed to depress said foot pedal, before said foot pedal is moved into said position, said means being operative by pressure from said operator's heel to move said foot pedal out of said position.

10. In a brake equipment adapted to be controlled from either end of a car, the combination with a foot operated pedal at each end of the car, of means operative by said pedals upon depressing with foot pressure to effect an application of the brakes and operative upon the relief of foot pressure to effect a release of the brakes, each of said foot pedals being depressible to a position flush with the floor of the car for rendering the other foot pedal effective to control the operation of said means to apply and release the brakes, means for defining said flush position of said foot pedals, resilient means operative to hold said pedals in said flush position and operative when said pedals are out of said flush position to oppose manual pressure on said pedals, and a key carried at the end of the car from which the brakes are being controlled, said key being engageable by the operator's foot before the foot pedal is moved to flush position and operative by the operator's foot to move said pedal out of flush position.

11. In a brake equipment adapted to be controlled from either end of the car, the combination with a foot operated pedal at one side of one end of the car, another foot operated pedal at the opposite side of the opposite end of the car, a cross lever having a connection intermediate its ends to a brake valve device for controlling the operation thereof, mechanical members connecting one end of said lever to the foot pedal at one end of said car, like mechanical members connecting the other end of said lever to the foot pedal at the opposite end of the car, each of said foot pedals being operative to control the operation of said lever and being depressible to a position in which no part of the pedal is above the floor of the car, and in which the connection between the associated ends of said cross lever and mechanical members becomes a fixed fulcrum, means for automatically holding said pedals in said position, and means associated only with the foot pedal controlling the operation of said brake valve device and engageable by the foot of an operator before the pedal is moved to said position for preventing unintentional movement into said position and operative by foot pressure to move said pedal out of said position in case said pedal is moved to said position.

12. In a brake equipment adapted to be controlled from either end of the car, the combination with a foot operated pedal at one side of one end of the car, another foot operated pedal at the opposite side of the opposite end of the car, a cross lever having a connection intermediate its ends to said brake valve device for controlling the operation of said brake valve device, mechanical members connecting one end of said lever to the foot pedal at one end of said car, like mechanical members connecting the other end of said lever to the foot pedal at the opposite end of the car, the mechanical members connecting the brake valve device to one foot pedal being substantially parallel to the mechanical members connecting the brake valve device to the other foot pedal, each of said foot pedals being depressible to a position in which no part of the pedal is above the floor of the car, and in which the connection between the associated ends of said cross lever and mechanical members becomes a fixed fulcrum, means for automatically holding said pedals in said position, and means associated only with the foot pedal controlling the operation of said brake valve device and engageable by the foot of an operator before the pedal is moved to said position for preventing unintentional movement into said position and operative by foot pressure to move said pedal out of said position in case said pedal is moved to said position.

JOSEPH M. DAPRON.